United States Patent
Umehara et al.

(10) Patent No.: US 9,805,691 B2
(45) Date of Patent: Oct. 31, 2017

(54) DISPLAY, CONTROL METHOD, AND STORAGE MEDIUM

(71) Applicant: CANON KABUSHIKI KAISHA, Tokyo (JP)

(72) Inventors: Makoto Umehara, Kawasaki (JP); Hiroichi Yamaguchi, Sagamihara (JP); Kazuki Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 14/790,200

(22) Filed: Jul. 2, 2015

(65) Prior Publication Data

US 2016/0027401 A1 Jan. 28, 2016

(30) Foreign Application Priority Data

Jul. 22, 2014 (JP) .................. 2014-149162

(51) Int. Cl.
 *G09G 5/00* (2006.01)
 *G02B 27/01* (2006.01)
 *G06F 3/147* (2006.01)

(52) U.S. Cl.
 CPC .......... *G09G 5/006* (2013.01); *G02B 27/017* (2013.01); *G06F 3/147* (2013.01); *G02B 2027/014* (2013.01); *G02B 2027/0138* (2013.01); *G09G 2370/16* (2013.01)

(58) Field of Classification Search
 None
 See application file for complete search history.

(56) References Cited

U.S. PATENT DOCUMENTS

| 6,179,400 | B1 | 1/2001 | Akahira et al. |
| 9,070,215 | B2 | 6/2015 | Oikawa et al. |
| 2008/0297436 | A1 | 12/2008 | Oikawa et al. |
| 2015/0049115 | A1 | 2/2015 | Oikawa et al. |
| 2015/0110364 | A1* | 4/2015 | Niinuma ............ G06K 9/00234 382/116 |
| 2016/0173805 | A1* | 6/2016 | Claus ................... H04N 17/004 348/148 |

FOREIGN PATENT DOCUMENTS

| JP | 2008-300983 A | 12/2008 |
| JP | 2008-306602 A | 12/2008 |

* cited by examiner

*Primary Examiner* — Ryan R Yang
(74) *Attorney, Agent, or Firm* — Fitzpatrick, Cella, Harper & Scinto

(57) ABSTRACT

A display obtains a first image by image capturing, receives, from an external apparatus, a second image generated based on the first image, determines a communication quality with the external apparatus in reception of the second image, and controls to display the second image on a display unit until a value indicating a degree of degradation of the communication quality exceeds a first threshold as a result of determination, and display the first image on the display unit when the value indicating the degree of degradation of the communication quality exceeds the first threshold. The display controls to display the first image until the value indicating the degree of degradation of the communication quality becomes smaller than a second threshold smaller than the first threshold after exceeding the first threshold.

12 Claims, 7 Drawing Sheets

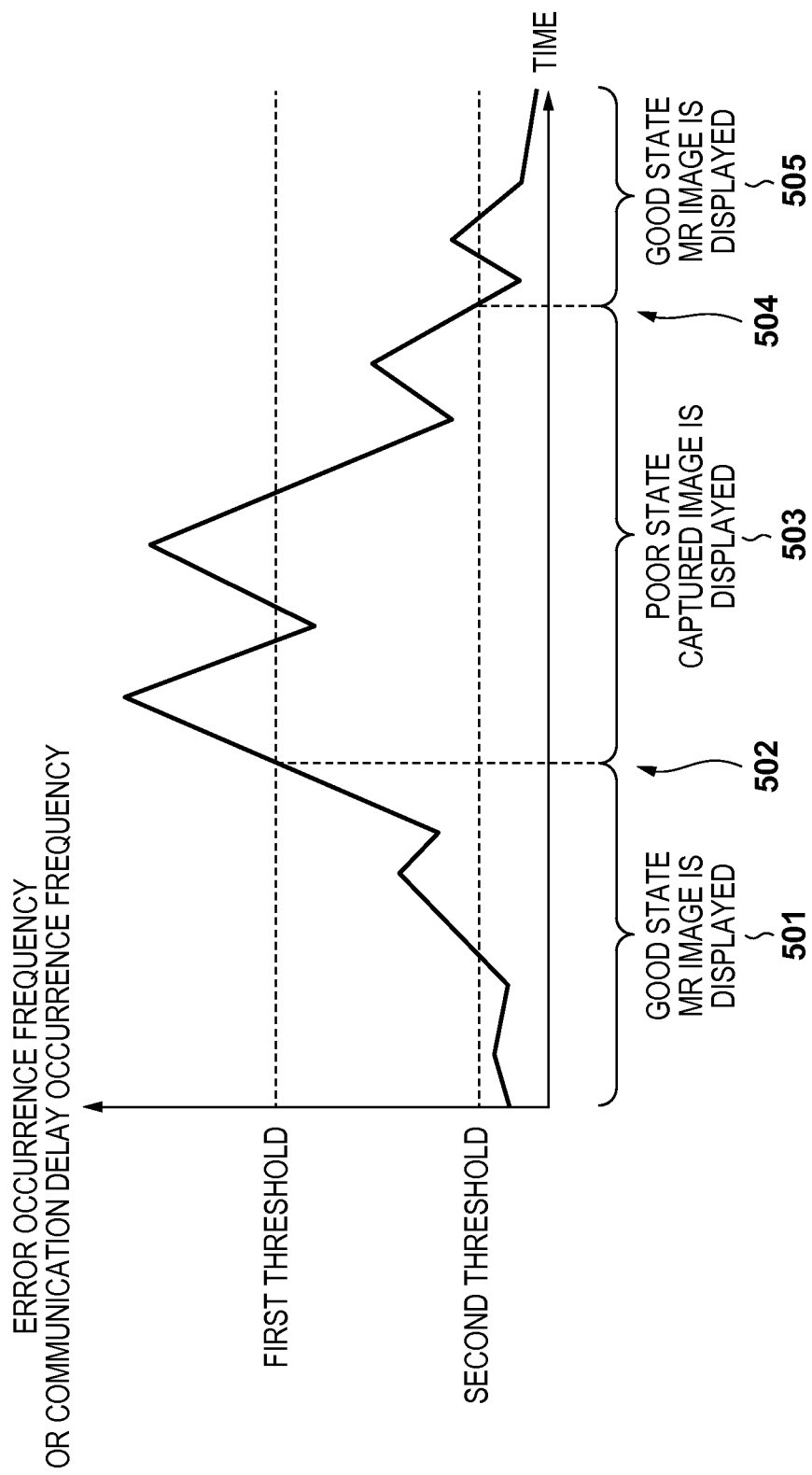

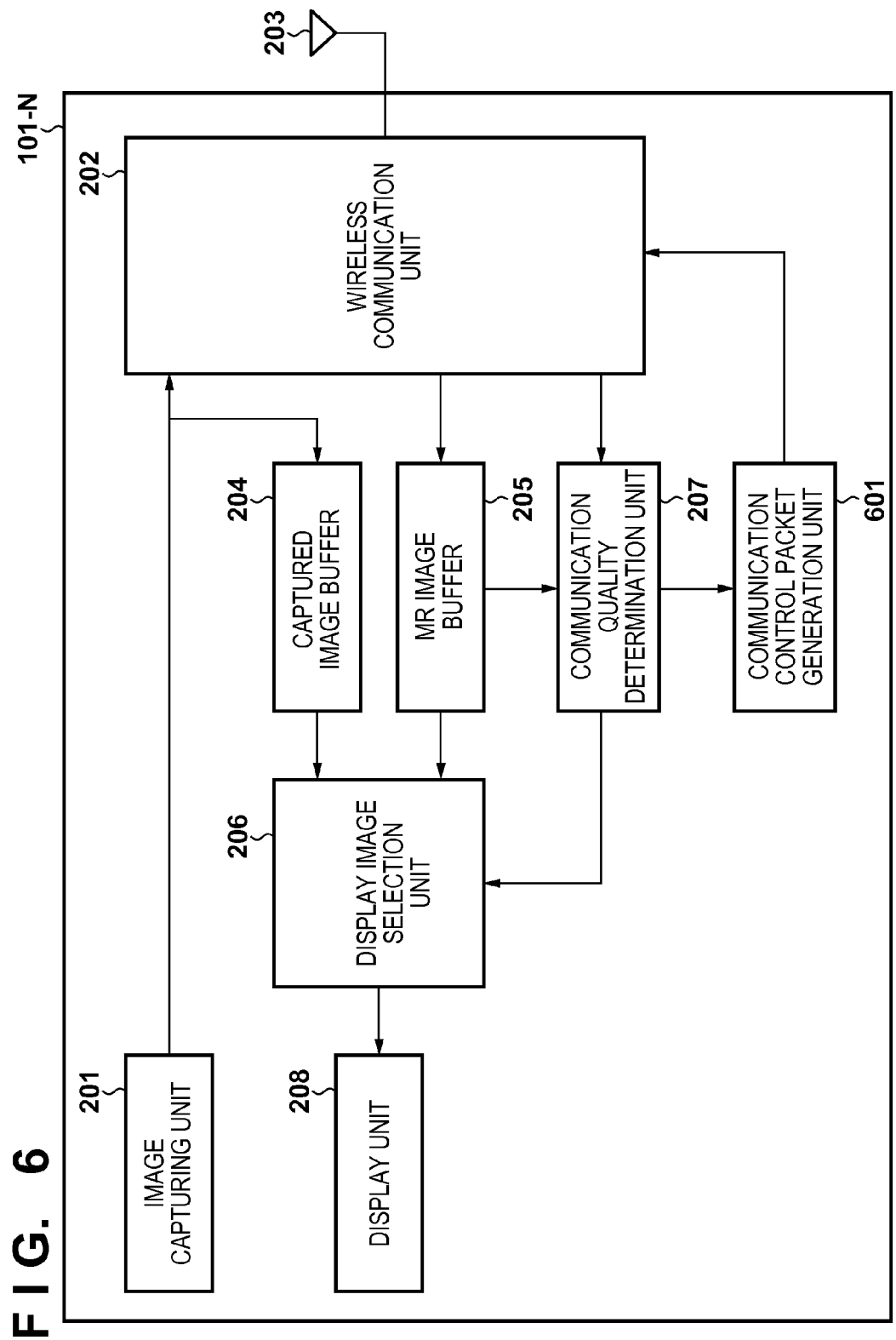

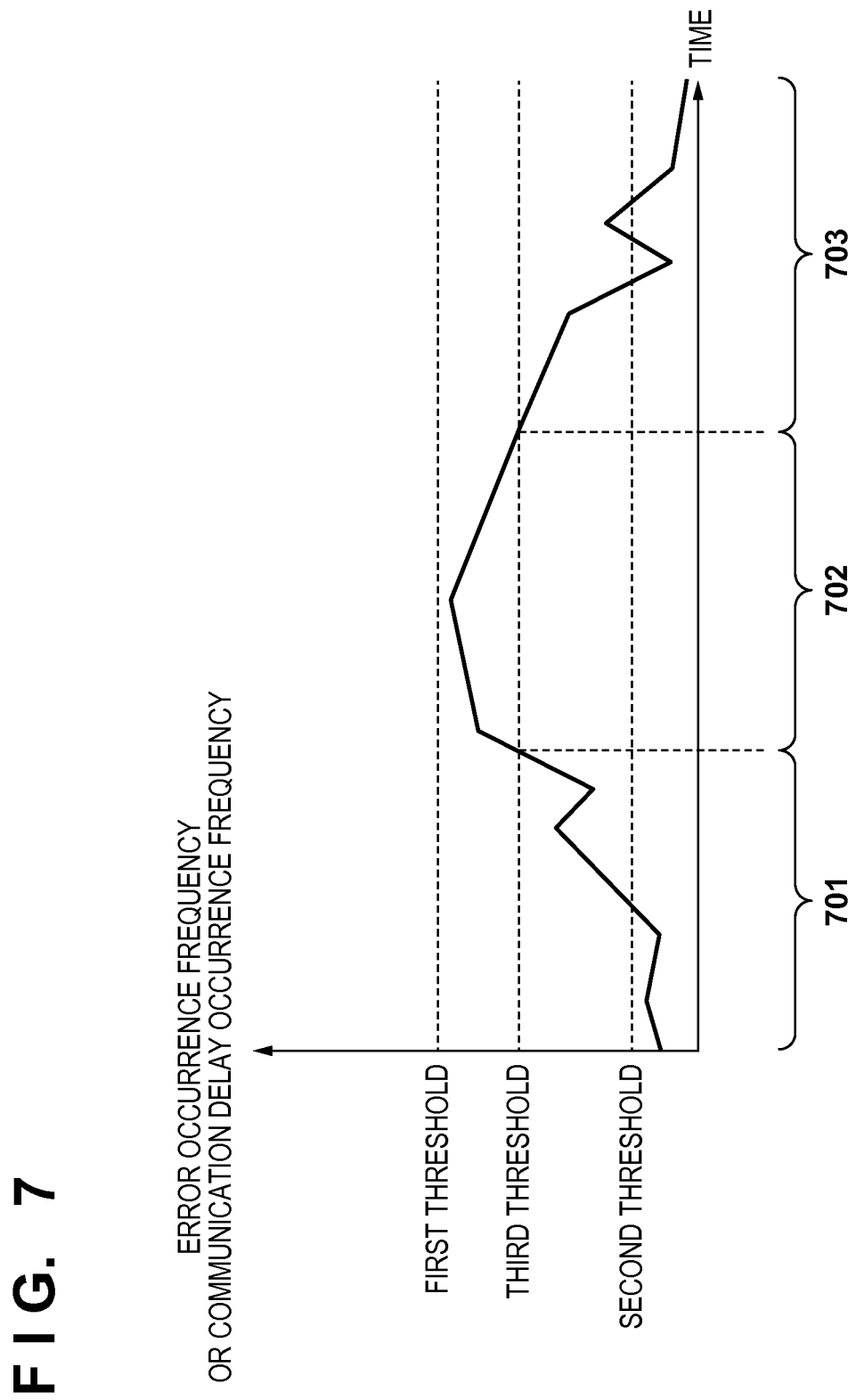

DISPLAY, CONTROL METHOD, AND STORAGE MEDIUM

BACKGROUND OF THE INVENTION

Field of the Invention

The present invention relates to a display that switches an image to be displayed.

Description of the Related Art

Recently, the MR (Mixed Reality) technique has received attention as a technique of seamlessly combining physical and virtual worlds in real time. The MR system sometimes uses a head-mounted display and, for example, a video see-through HMD (Head Mounted Display) is used. In an MR system using the video see-through HMD, a video almost coincident with an object viewed from the pupil position of the HMD user is captured by a camera or the like. The HMD user can view an image (to be referred to as an "MR image" hereinafter) obtained by superimposing CG (Computer Graphics) on this captured image.

If a transmission error of an image frame occurs in the MR system, the field of view of the HMD user may not be ensured or the HMD user may feel unnatural. To solve this, Japanese Patent Laid-Open No. 2008-300983 discloses a technique of, when a transmission error of an image frame occurs, switching an image to be displayed on the HMD from an MR image to a captured image. Japanese Patent Laid-Open No. 2008-306602 discloses a technique of, when a transmission error occurs in image data for the right or left eye, generating an interpolated image using either one of an immediately preceding image and an image on an error-free side based on the motion amount of the HMD user, and displaying the interpolated image on the HMD.

When wireless communication is used to transmit image data, the communication environment sometimes becomes unstable owing to a change of the peripheral environment or the like, and a transmission error intermittently and frequently occurs for a long period. To solve this, in a technique as disclosed in Japanese Patent Laid-Open Nos. 2008-300983 and 2008-306602, when a transmission error frequently occurs, the HMD display image is frequently switched between a normal MR image and another image (captured image or interpolated image). If the HMD display image is frequently switched for each image frame, the HMD user feels unnatural or uncomfortable, and the eyes of the HMD user are strained. This problem is not limited to the HMD, and can arise in all displays of the MR system.

The present invention has been made to solve the above problem, and provides a technique capable of performing switching of the image display suited to viewing in accordance with the state of the communication quality.

SUMMARY OF THE INVENTION

According to one aspect of the present invention, there is provided a display comprising: an obtaining unit configured to obtain a first image by image capturing; a reception unit configured to receive, from an external apparatus, a second image generated based on the first image; a determination unit configured to determine a communication quality with the external apparatus in reception by the reception unit; and a display control unit configured to control to display the second image on a display unit until a value indicating a degree of degradation of the communication quality exceeds a first threshold as a result of determination by the determination unit, and display the first image on the display unit when the value indicating the degree of degradation of the communication quality exceeds the first threshold, wherein the display control unit controls to display the first image until the value indicating the degree of degradation of the communication quality becomes smaller than a second threshold smaller than the first threshold after exceeding the first threshold.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a graph showing an example of the correspondence between the communication quality and the operation of the HMD;

FIG. 6 is a block diagram showing another example of the functional arrangement of the HMD; and FIG. 7 is a graph for explaining the relationship between the communication quality and communication control.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

<<First Embodiment>>

(System Arrangment)

Figure 1:
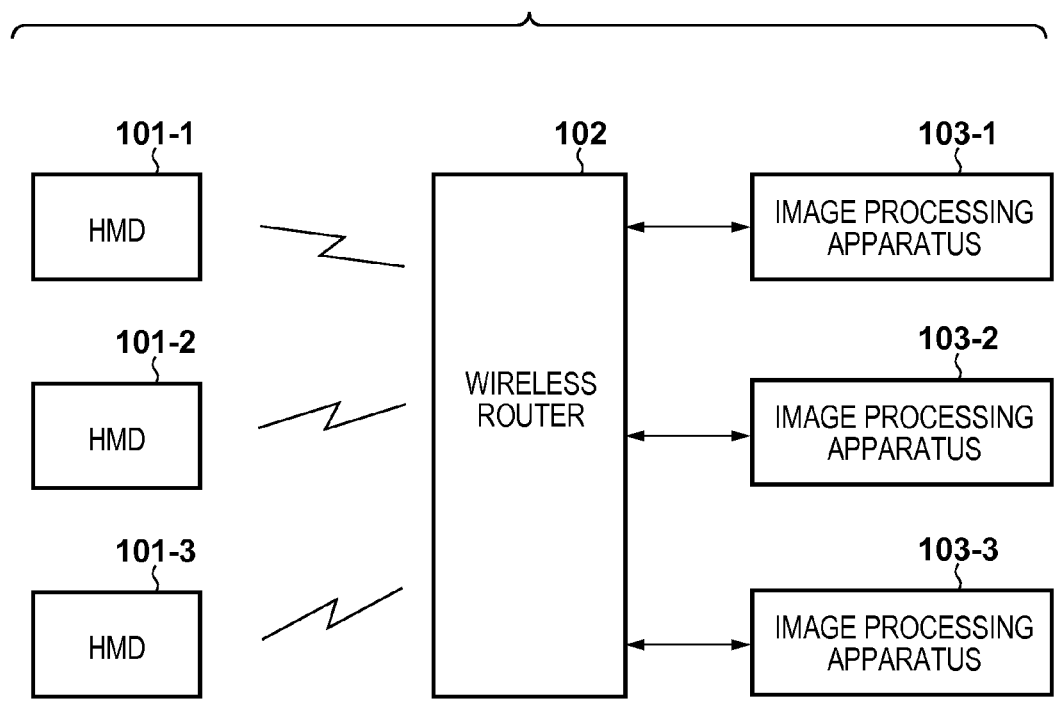
FIG. 1 is a block diagram showing an example of the arrangement of a wireless MR system.

FIG. 1 shows an example of the arrangement of a wireless MR system using a video see-through HMD. The wireless MR system according to this embodiment includes HMDs 101-1 to 101-3 having a wireless communication function, a wireless router 102, and image processing apparatuses 103-1 to 103-3 that are connected via, for example, wires to the wireless router 102. Note that a head-mounted display (HMD) is used as a device that displays an image such as an MR image in the following description, but the device is not limited to this. That is, for example, a handheld display or a mobile phone may be used instead of the HMD.

The HMDs 101-1 to 101-3 are wirelessly connected to the wireless router 102, and communicate with the image processing apparatuses 103-1 to 103-3 via the wireless router 102. A wireless scheme used in this wireless communication is an arbitrary wireless communication scheme such as IEEE802.11ac or IEEE802.11ad. The connection between the wireless router 102 and the image processing apparatuses 103-1 to 103-3 uses a wired LAN (Local Area Network) such as Ethernet®.

In the wireless MR system according to this embodiment, the HMD 101-N (N is an integer of 1 to 3) transmits, to the image processing apparatus 103-N, an image captured at a position almost coincident with the pupil position of the user. The image processing apparatus 103-N generates an MR image by superimposing CG (Computer Graphics) on the received captured image, and transmits it to the HMD 101-N. The HMD 101-N presents, to the HMD user, the MR image transmitted from the image processing apparatus 103-N. As a result, the MR space is presented to the HMD user.

This embodiment assumes that the image processing apparatus 103-N performs MR image generation processing of the HMD 101-N, and the wireless router 102 performs routing of communication between the HMD 101-N and the image processing apparatus 103-N. Also, this embodiment assumes that the image processing apparatus performs MR image generation processing of superimposing CG on a captured image. However, the image processing apparatus 103-N may transmit only CG to the HMD 101-N, and the HMD 101-N may generate an MR image by superimposing the CG on a captured image.

Although each of the numbers of HMDs and image processing apparatuses is three (that is, 1≤N≤3) in this embodiment, the following discussion is applicable to an arbitrary number of HMDs.

(Apparatus Arrangement)

Figure 2:
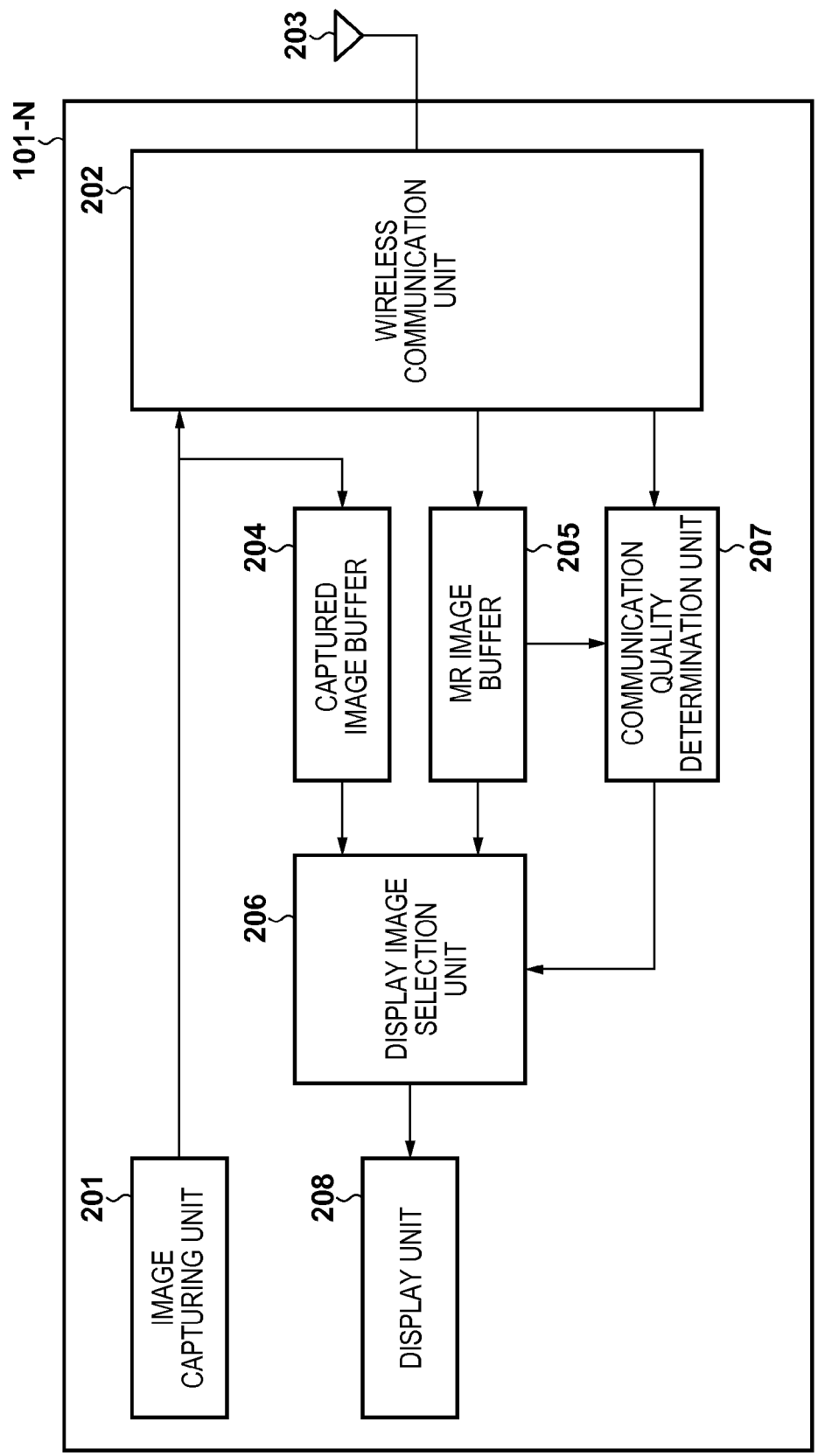
FIG. 2 is a block diagram showing an example of the functional arrangement of an HMD.

FIG. 2 shows an example of the functional arrangement of the HMD 101-N. The HMD 101-N includes, for example, an image capturing unit 201, a wireless communication unit 202, an antenna 203, a captured image buffer 204, an MR image buffer 205, a display image selection unit 206, a communication quality determination unit 207, and a display unit 208.

The image capturing unit 201 is an image capturing unit that performs image capturing at a predetermined frame rate to obtain a captured image. The image capturing unit 201 captures, for example, a video almost coincident with an object viewed from the pupil position of the HMD user. The image capturing unit 201 adds an image frame number to the captured image to generate captured image data and output it to the wireless communication unit 202 and the captured image buffer 204. Note that the image frame number to be added is incremented in, for example, every image capturing.

The wireless communication unit 202 generates a captured image packet by adding an error detection code such as CRC (Cyclic Redundancy Check) to the captured image data output from the image capturing unit 201. The wireless communication unit 202 generates a wireless signal by performing, on this captured image packet, modulation processing corresponding to a wireless communication scheme to be used, and transmits the wireless signal to the wireless router 102 via the antenna 203. Accordingly, the captured image packet is transmitted to the image processing apparatus 103-N via the wireless router 102. The wireless communication unit 202 receives, from the antenna 203, an MR image packet transmitted from the image processing apparatus 103-N via the wireless router 102.

Note that the wireless communication unit 202 may receive an MR image packet including an MR image itself, or a packet including an image (for example, CG) for compositing an MR image. When a packet including an image for compositing an MR image is received, an MR image composition unit (not shown) forms an MR image from a captured image and an image extracted from the received packet. In this case, the wireless communication unit 202 may transmit, to the image processing apparatus 103-N, not an image captured by the image capturing unit 201, but information of the position and orientation of the HMD 101-N that have been detected by a position and orientation detection unit (not shown). In this manner, the HMD 101-N receives, by using the wireless communication unit 202, an MR image itself or a packet including an image for compositing an MR image, and obtains the MR image based on the image included in the received packet. The obtained MR image is stored in the MR image buffer 205.

As will be described later, an error detection code such as CRC is added to the MR image packet, as in the captured image packet. The wireless communication unit 202 can detect an error of received data. When the wireless communication unit 202 detects an error in the received MR image packet, it outputs, to the communication quality determination unit 207, information representing that the error has been detected.

The captured image buffer 204 is a buffer that holds an image captured by the image capturing unit 201. The captured image buffer 204 operates based on, for example, the readout instruction of the display image selection unit 206, and outputs a captured image corresponding to a designated image frame number to the display image selection unit 206. The MR image buffer 205 is a buffer that holds an MR image included in a packet received by the wireless communication unit 202, or an image for compositing an MR image. The MR image buffer 205 operates based on, for example, the readout instruction of the display image selection unit 206, and outputs an MR image corresponding to a designated image frame number to the display image selection unit 206.

When communication delays owing to a cause such as congestion in a peripheral communication environment, storage, in the buffer, of an MR image corresponding to an image frame number designated by the display image selection unit 206 may not be completed. That is, at the timing to display an MR image (or select a display MR image), reception of a packet may not be completed at a stage preceding by the time taken for processing of, for example, receiving a packet, extracting an MR image, and storing it in the MR image buffer. In this case, the MR image buffer 205 outputs, to the display image selection unit 206, an MR image corresponding to an image frame number closest to the designated image frame number. More specifically, when a communication delay occurs, the MR image buffer 205 outputs, to the display image selection unit 206, the latest MR image out of MR images stored so far. When an MR image corresponding to the designated image frame number is not stored, the MR image buffer 205 determines that a communication delay has occurred, and notifies the communication quality determination unit 207 that the communication delay has occurred.

Note that the wireless communication unit 202 may determine whether the communication delay has occurred. For example, based on whether reception of a packet regarding an MR image that should be displayed at a given timing is completed at time earlier than this timing by the time taken for each processing mentioned above, the wireless communication unit 202 determines whether a communication delay has occurred for the packet regarding the MR image.

The display image selection unit 206 reads out an image from either of the captured image buffer 204 and the MR image buffer 205 based on the determination result of the communication quality determination unit 207, and outputs the image to the display unit 208. For example, when the communication quality determination unit 207 determines that the communication quality is stably good, the display image selection unit 206 reads out an image from the MR image buffer 205 and outputs it to the display unit 208. For example, when the communication quality determination unit 207 determines that the communication quality is poor, the display image selection unit 206 reads out an image from the captured image buffer 204, and outputs it to the display unit 208. Note that the display image selection unit 206 reads out an image at every predetermined timing at the same frame rate as that of the image capturing unit 201, and outputs the image. Also, the display image selection unit 206 performs image readout of an image frame number M (M is an integer) a predetermined time after the image capturing unit 201 completes captured image data generation processing of the image frame number M. This predetermined time is decided based on, for example, the time taken for communication between the HMD 101-N and the image processing apparatus 103-N, and the time taken for MR image generation processing of the image processing apparatus 103-N.

Based on a received data error detection result output from the wireless communication unit 202, and a communication delay detection result output from the MR image buffer 205, the communication quality determination unit 207 evaluates whether the communication quality is stably good, and outputs the result to the display image selection unit 206. For example, the communication quality determination unit 207 measures a value indicating the degree of degradation of the communication quality such as an error or communication delay occurrence count per predetermined time, compares this value with a predetermined threshold, and evaluates whether the communication quality is stably good, details of which will be described later.

The display unit 208 is a display that is installed at, for example, a position almost coincident with the pupil position of the user, and presents an MR image to the user by displaying an image output from the display image selection unit 206. Note that each functional unit described above is implemented as hardware or software in the HMD. The HMD includes a CPU and memories such as a ROM and RAM, none of which are shown in FIG. 2. When the display image selection unit 206 and the communication quality determination unit 207 are implemented as software, programs corresponding to these functions are stored in the ROM. The CPU executes these programs, thereby executing these functions.

Figure 3:
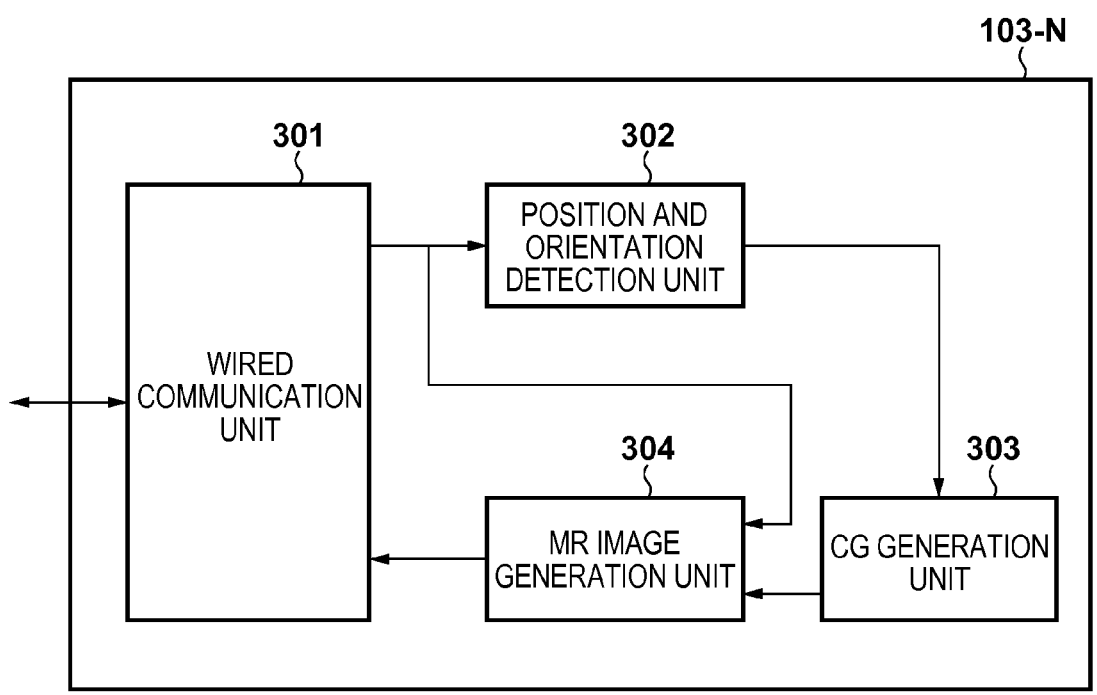
FIG. 3 is a block diagram showing an example of the functional arrangement of an image processing apparatus.

Subsequently, an example of the arrangement of the image processing apparatus 103-N will be described with reference to FIG. 3. The image processing apparatus 103-N includes, for example, a wired communication unit 301, a position and orientation detection unit 302, a CG generation unit 303, and an MR image generation unit 304.

The wired communication unit 301 establishes a wired connection with, for example, the wireless router 102, receives captured image data transmitted by the HMD 101-N from the wireless router 102, and outputs it to the position and orientation detection unit 302 and the MR image generation unit 304. The wired communication unit 301 transmits MR image data generated by the MR image generation unit 304 to the wireless router 102. Note that the wired communication unit 301 may generate an MR image packet by adding an error detection code such as CRC to MR image data, and transmit the MR image packet to the wireless router 102. Alternatively, the wireless router 102 may generate an MR image packet from MR image data. The MR image packet is wirelessly transmitted from the wireless router 102 to the HMD 101-N.

The position and orientation detection unit 302 detects the position and orientation of the HMD 101-N from captured image data of the HMD 101-N, and outputs them to the CG generation unit 303. The position and orientation detection unit 302 detects the position and orientation of the HMD 101-N by, for example, a method of arranging a plurality of indices at known positions in the physical space and detecting the coordinates of an index on a captured image. The plurality of indices may be constituted by circular markers having different colors, or feature points having different features, such as natural features. A quadrangular index formed from a quadrangular region having a certain area can also be used as an index. That is, the index is arbitrary as long as the coordinates of an index on a captured image can be detected and the index can be identified. Note that the position and orientation detection unit 302 may detect the position and orientation of the HMD 101-N by, for example, receiving position and orientation information of the HMD 101-N from the HMD 101-N.

The CG generation unit 303 incorporates a database in which data about a virtual object in the virtual space is saved. Based on the data saved in the database, the CG generation unit 303 generates CG used when the virtual object is viewed from a position and orientation of the HMD 101-N that are input from the position and orientation detection unit 302. Then, the CG generation unit 303 outputs the CG to the MR image generation unit 304. The MR image generation unit 304 generates an MR image by superimposing the CG input from the CG generation unit 303 on a captured image of the HMD 101-N. The MR image generation unit 304 adds the same image frame number as that of the captured image to generate MR image data and output it to the wired communication unit 301.

Note that when the image processing apparatus 103-N transmits, to the HMD 101-N, not an MR image but an image (for example, CG) for compositing an MR image to be formed by the HMD 101-N, no captured image may be transmitted from the HMD 101-N. In this case, the position and orientation detection unit 302 detects the position and orientation of the HMD 101-N by, for example, receiving position and orientation information of the HMD 101-N from the HMD 101-N. In the above-described manner, the CG generation unit 303 generates CG used when the virtual object is viewed from the position and orientation of the HMD 101-N, and transmits the generated CG to the HMD 101-N via the wired communication unit 301. In this case, the MR image generation unit 304 is omitted.

Note that each functional unit described above is implemented as hardware or software in the image processing apparatus. The image processing apparatus includes a CPU and memories such as a ROM and RAM, none of which are shown in FIG. 3. When the position and orientation detection unit 302, the CG generation unit 303, and the MR image generation unit 304 are implemented as software, programs corresponding to these functions are stored in the ROM. The CPU executes these programs, thereby executing these functions.

(Processing Sequence)

Next, the operation of the HMD 101-N in the wireless MR system will be explained with reference to the flowchart of FIG. 4. Note that the flowchart in FIG. 4 corresponds to processing for one image frame, and the HMD 101-N repeats and executes this processing at a predetermined frame rate. Each step in the flowchart of FIG. 4 is processed by, for example, executing a program stored in the memory of the HMD by the CPU of the HMD.

Figure 4:
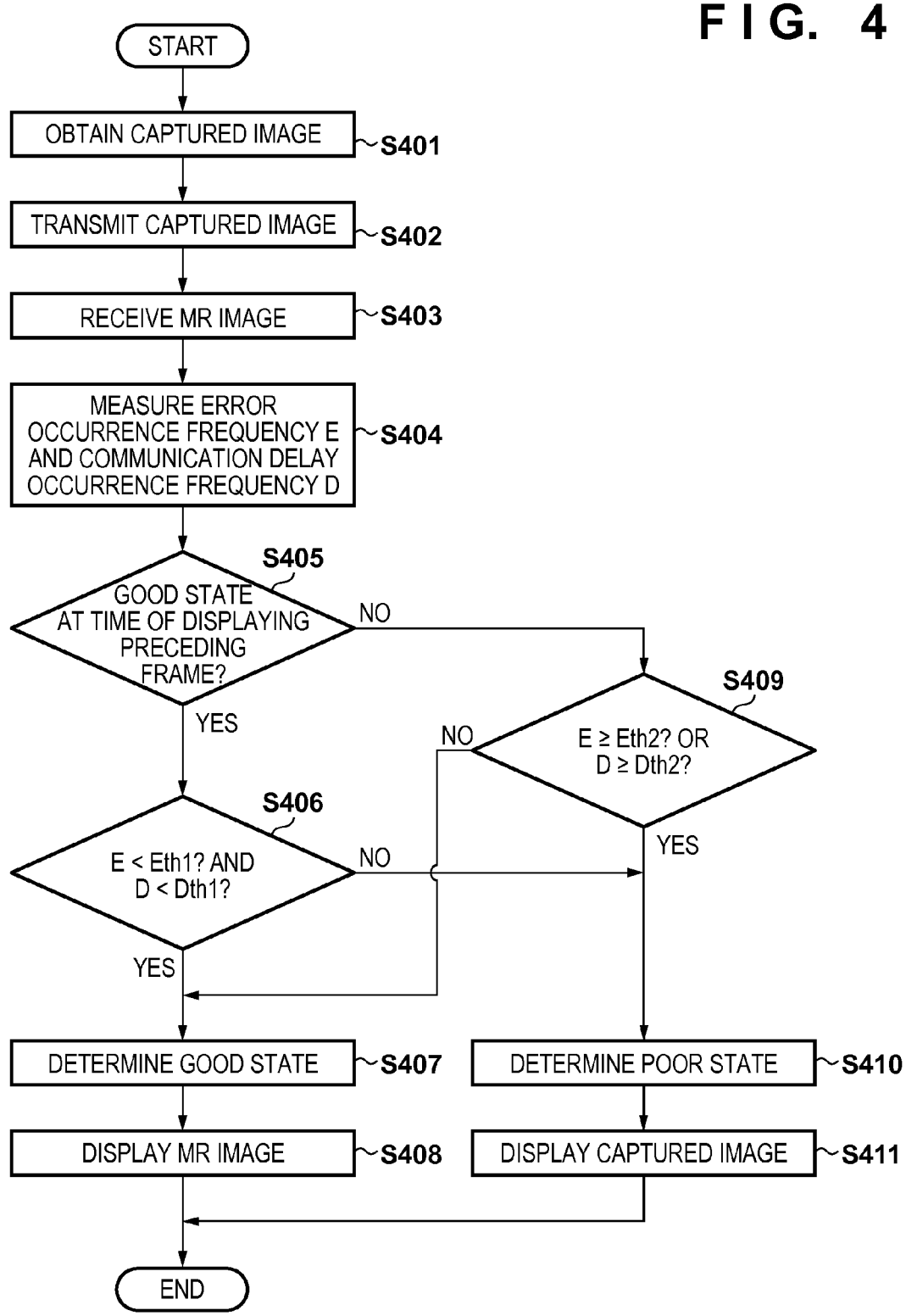
FIG. 4 is a flowchart showing an example of the sequence of processing to be executed by the HMD.

In the processing of FIG. 4, first, the image capturing unit 201 executes image capturing to obtain a captured image (step S401). The wireless communication unit 202 generates a captured image packet including the captured image, and transmits the captured image packet to the image processing apparatus 103-N via the wireless router 102 (step S402). The wireless communication unit 202 receives, from the wireless router 102, the MR image packet transmitted from the image processing apparatus 103-N (step S403). Note that the HMD 101-N may transmit, to the image processing apparatus 103-N in step S402, position and orientation information of the HMD 101-N obtained when image capturing was executed. In step S403, the HMD 101-N may receive, from the image processing apparatus 103-N, not the MR image itself, but a packet including an image for compositing an MR image, and may obtain the MR image based on the captured image and the image for compositing the MR image.

After that, the communication quality determination unit 207 evaluates whether the communication quality in wireless communication is good when the MR image or the image for compositing an MR image is received in step S403 (steps S404 to S407, S409, and S410). The evaluation of whether the communication quality is good uses a value indicating the degree of degradation of the communication quality. The value indicating the degree of degradation of the communication quality includes at least either of the frequency at which an error occurred in a received signal and the frequency at which a communication delay occurred to a degree at which reception of a packet was not completed at a timing earlier than the display timing of an image by the time taken for predetermined processing. Needless to say, a value other than these values may be used as a value indicating the degree of degradation of the communication quality.

If the communication quality determination unit 207 determines that the value indicating the degree of degradation of the communication quality exceeds the first threshold and the communication quality is degraded, it evaluates that the communication quality is poor until the value indicating the degree of degradation becomes smaller than the second threshold smaller than the first threshold. That is, the communication quality determination unit 207 uses the two thresholds. After the value indicating the degree of degradation of the communication quality exceeds the first threshold, the communication quality determination unit 207 evaluates that the poor state of the communication quality is maintained until the degree of degradation of the communication quality becomes sufficiently low. This can prevent frequent switching of the display image in the HMD 101-N.

As for details of this processing, processing representing an example in which the frequency at which an error occurred in a received signal and the frequency at which a communication delay occurred are used as values indicating the degree of degradation of the communication quality is equivalent to steps S404 to S407, S409, and S410 of FIG. 4. First, the communication quality determination unit 207 measures the error occurrence frequency and the communication delay occurrence frequency based on a received data error detection result output from the wireless communication unit 202 and a communication delay detection result output from the MR image buffer 205 (step S404). Note that the wireless communication unit 202 suffices to detect an error by an arbitrary method capable of detecting an error. For example, an error may be detected using FCS (Frame Check Sequence) included in a MAC frame in the IEEE802.11 standard.

For example, the communication quality determination unit 207 measures a CRC error detection count per 10 sec as the error occurrence frequency, and a delay occurrence count per 10 sec as the delay occurrence frequency. Note that E represents the error occurrence frequency, and D represents the delay occurrence frequency. The communication quality determination unit 207 may calculate the error occurrence frequency E and the delay occurrence frequency D from the error occurrence count and the delay occurrence count not in 10 sec but in another predetermined period.

Subsequently, the communication quality determination unit 207 determines whether it was determined that the communication quality was good when the display unit 208 displayed a preceding frame (step S405). That is, the communication quality determination unit 207 determines whether the communication quality was poor so that the value indicating the degree of degradation of the communication quality was equal to or larger than the second threshold after exceeding the first threshold at the time of displaying a preceding frame. If the communication quality was good at the time of displaying a preceding frame (YES in step S405), the communication quality determination unit 207 advances the process to step S406.

In step S406, the communication quality determination unit 207 determines whether the error occurrence frequency E is lower than a first threshold Eth1 of the error occurrence frequency, and whether the communication delay occurrence frequency D is lower than a first threshold Dth1 of the communication delay occurrence frequency. Note that the first threshold Eth1 of the error occurrence frequency and the first threshold Dth1 of the communication delay occurrence frequency can be arbitrarily set. For example, the first threshold can be set to a value equal to or smaller than the lower limit value of the error/communication delay occurrence frequency at which the HMD user feels unnatural or uncomfortable or the eyes of the HMD user are strained.

If both the error occurrence frequency E and the communication delay occurrence frequency D are smaller than their first thresholds (YES in step S406), the communication quality determination unit 207 advances the process to step S407. In this case, the communication quality determination unit 207 determines that the communication quality is maintained in the good state because the communication quality at the time of displaying a preceding frame was good, and both the error occurrence frequency E and the communication delay occurrence frequency D are smaller than their thresholds (step S407). In this case, the display image selection unit 206 reads out an MR image from the MR image buffer 205, and outputs it to the display unit 208 (step S408).

In contrast, if at least either of the error occurrence frequency E and the communication delay occurrence frequency D is equal to or higher than the first threshold (NO in step S406), the communication quality determination unit 207 advances the process to step S410. In this case, the communication quality determination unit 207 determines that the communication quality at the time of displaying a preceding frame was good, but the value indicating the degree of degradation of the communication quality has exceeded the first threshold, and the communication quality has changed to the poor state (step S410). In this case, therefore, the display image selection unit 206 reads out a captured image from the captured image buffer 204, and outputs it to the display unit 208 (step S411).

The process returns to step S405, and if the communication quality determination unit 207 determines that the communication quality was poor at the time of displaying a preceding frame (NO in step S405), it advances the process to step S409. In step S409, it is determined whether the error occurrence frequency E is equal to or higher than a second threshold Eth2 of the error occurrence frequency, and whether the communication delay occurrence frequency D is equal to or higher than a second threshold Dth2 of the communication delay occurrence frequency. Note that the second threshold is used to give a hysteresis to the determination of the state of the communication quantity, and suppress a frequent change of the determination result. The second threshold can be appropriately set to be a value smaller than the first threshold so as to prevent a frequent change of the determination result.

The determination in step S409 is performed in a state in which the communication quality was poor at the time of displaying a preceding, that is, a state in which the value indicating the degree of degradation of the communication quality has not become smaller than the second threshold yet after exceeding the first threshold. Hence, if it is determined in step S409 that the value indicating the degree of degradation of the communication quality becomes smaller than the second threshold, the communication quality determination unit 207 can determine that the communication quality has shifted to the good state. If, therefore, both the error occurrence frequency E and the communication delay occurrence frequency D are lower than their second thresholds (NO in step S409), the communication quality determination unit 207 determines that the communication quality has changed to the good state (step S407). In this case, the display image selection unit 206 reads out an MR image from the MR image buffer 205, and outputs it to the display unit 208 (step S408).

If at least either of the error occurrence frequency E and the communication delay occurrence frequency D is equal to or higher than the second threshold (YES in step S409), the state in which the value indicating the degree of degradation of the communication quality is equal to or larger than the second threshold after exceeding the first threshold is maintained. In this case, the communication quality determination unit 207 determines that the communication quality is poor (step S410). In this case, the display image selection unit 206 reads out a captured image from the captured image buffer 204, and outputs it to the display unit 208 (step S411).

The relationship between the error occurrence frequency or communication delay occurrence frequency, the determination result of the state of the communication quality, and an image to be displayed in the HMD 101-N will be explained with reference to FIG. 5. In FIG. 5, the error occurrence frequency and the communication delay occurrence frequency are plotted altogether along one axis. However, these frequencies are different indices in practice, so thresholds are set individually for the error occurrence frequency and the communication delay occurrence frequency, respectively, and the respective frequencies are individually compared with their thresholds.

In FIG. 5, the error/communication delay occurrence frequency is lower than the first threshold in a period 501. Since the error/communication delay occurrence frequency is lower than the second threshold at the start point of the period 501, it can be determined that the state of the communication quality at the time of displaying a preceding frame was good. In the HMD 101-N, therefore, YES is determined in step S405 and YES is determined in step S406 in the processing of FIG. 4. As a result, it is determined that the communication quality is good (step S407), and the display unit 208 displays the MR image (step S408).

Assume that the error/communication delay occurrence frequency exceeds the first threshold at a timing 502. In this case, in the HMD 101-N, YES is determined in step S405 and NO is determined in step S406 in the processing of FIG. 4. As a result, it is determined that the communication quality is poor (step S410), and the display unit 208 displays the captured image (step S411).

In a period 503, it can be determined that the state of the communication quality at the time of displaying a preceding frame was poor because the value indicating the degree of degradation of the communication quality is smaller than the second threshold after exceeding the first threshold. In the period 503, the error/communication delay occurrence frequency does not become lower than the second threshold. In the HMD 101-N, NO is determined in step S405 and YES is determined in step S409 in the processing of FIG. 4. As a result, it is determined that the communication quality is poor (step S410), and the display unit 208 keeps displaying the captured image (step S411). That is, in the period 503, even when the error/communication delay occurrence frequency is lower than the first threshold, it is determined that the communication quality is poor. This operation can prevent frequent switching of the HMD display image between the captured image and the MR image when the error/communication delay occurrence frequency fluctuates around the first threshold.

Assume that the error/communication delay occurrence frequency becomes lower than the second threshold at a timing 504. In this case, in the HMD 101-N, NO is determined in step S405 and NO is determined in step S409 in the processing of FIG. 4. As a result, it is determined that the communication quality is good (step S407), and the display unit 208 displays the MR image (step S408). Thereafter, in a period 505, it is determined that the communication quality is good until the error/communication delay occurrence frequency exceeds the first threshold again (step S407). The display unit 208 displays the MR image (step S408).

In this way, when the error/communication delay occurrence frequency exceeds the first threshold and the communication state changes to a state in which the HMD user feels unnatural or uncomfortable or the eyes of the HMD user are strained, the HMD 101-N according to this embodiment presents a captured image to the HMD user. Further, the HMD 101-N according to this embodiment suppresses frequent switching of the determination result and HMD display image by setting the second threshold in addition to the first threshold as thresholds for determining the communication state, and giving a hysteresis to the determination. Hence, frequent switching of the HMD display image when the communication state becomes unstable can be suppressed, and the unnatural or uncomfortable feeling of the HMD user and the eye strain can be mitigated.

In this embodiment, the state of the communication quality is determined based on the results of comparisons between the error occurrence frequency and communication delay occurrence frequency and their first and second thresholds, and the HMD display image is switched. However, this determination may use only either of the error occurrence frequency and the communication delay occurrence frequency. The values indicating the degree of degradation of the communication quality are not limited to the error occurrence frequency and the communication delay occurrence frequency. For example, the value indicating the degree of degradation of the communication quality may be specified using the strength of a received signal, the EVM (Error Vector Magnitude) of a received signal, or the like. As in the above description in which both the error occurrence frequency and the communication delay occurrence frequency are used, a plurality of values indicating the degree of degradation of the communication quality may be used simultaneously or one of them may be used.

In this embodiment, when the communication quality is good, even if an MR image includes an error, the display unit 208 displays the MR image in the HMD 101-N. However, the present invention is not limited to this. For example, while the communication quality is good, an interpolated image may be generated and displayed using the technique disclosed in Japanese Patent Laid-Open No. 2008-306602 or the like.

When the communication quality becomes poor, the HMD 101-N may notify the HMD user by display on the display unit 208 that the communication quality is poor or a captured image is displayed. In this case, the HMD 101-N may further include an OSD (On Screen Display) generation unit, and a message or an identification mark may be generated based on the determination result of the communication quality determination unit 207 and superimposed on a captured image. When the HMD 101-N determines that the communication quality is poor, the cause of the determination of the state may be displayed on the display unit 208 to notify the HMD user of the cause. Note that the displayed cause can be information such as either of the error occurrence frequency and the communication delay occurrence frequency that has exceeded the first threshold, that is, either of the values indicating the degree of degradation of the communication quality from which the poor communication quality is determined to arise. In this fashion, the HMD user is notified of at least either of information representing that the communication quality is poor and its cause, and is prompted to take a measure.

Although the first embodiment has described an MR system using a video see-through HMD, an optical see-through HMD may be used.

<<Second Embodiment>>

The first embodiment has described an example in which the communication state is determined by comparing the error occurrence frequency and the communication delay occurrence frequency with their first and second thresholds, and either of an MR image and captured image is selected as an HMD display image based on the determination result. In the second embodiment, the third threshold (first threshold>third threshold≥second threshold) is further set for each of the error occurrence frequency and the communication delay occurrence frequency. When the error/communication delay occurrence frequency exceeds the third threshold, communication control is performed to reduce the error/communication delay occurrence frequency. Therefore, switching of the HMD display image to the captured image is suppressed, and the MR image is presented to the HMD user as much as possible.

(System Arrangement)

The arrangement of a wireless MR system according to the second embodiment is the same as that according to the first embodiment, and a description thereof will not be repeated.

(Apparatus Arrangement)

FIG. 6 shows an example of the functional arrangement of an HMD 101-N according to this embodiment. Note that the same reference numerals denote the same blocks as those in FIG. 2 showing an example of the functional arrangement of the HMD 101-N according to the first embodiment, and a description thereof will not be repeated. In FIG. 6, in addition to the operation according to the first embodiment, a communication quality determination unit 207 compares the error occurrence frequency and the communication delay occurrence frequency with their third thresholds. When the error occurrence frequency and the communication delay occurrence frequency exceed with their third thresholds, it is determined that communication control needs to be changed, and a message indicative of this is output to a communication control packet generation unit 601.

The communication control packet generation unit 601 generates, based on the determination result output from the communication quality determination unit 207, a communication control packet that instructs a wireless router 102 to change communication control, and outputs the packet to a wireless communication unit 202. The communication control packet generation unit 601 generates a communication control packet in every predetermined cycle in this embodiment, but may generate a communication control packet only when changing communication control. In addition to the operation according to the first embodiment, the wireless communication unit 202 transmits, to the wireless router 102, the communication control packet output from the communication control packet generation unit 601. Here, the change of communication control includes, for example, changing at least either of the modulation scheme and the error correction code, or changing the priority of transmission data.

When the wireless router 102 receives the communication control packet from the HMD 101-N, it changes the contents of communication control regarding an MR image packet to be transmitted to the HMD 101-N in accordance with the contents. Assume that the wireless router 102 uses, for example, the 802.11ac wireless communication scheme and the 802.11e QoS (Quality of Service) scheme.

The wireless router 102 stores the index of an MCS (Modulation and Coding Scheme) using modulation of an MR image packet transmitted to each of HMDs 101-1 to 101-3. When the wireless router 102 is notified from the HMD 101-N to change at least either of the modulation scheme and the error correction code, it performs communication control to change the MCS index used to modulate an MR image packet to be transmitted to the HMD 101-N. That is, when the MCS index is changed, at least either of the modulation scheme and the error correction code is changed. As the MCS index is smaller, the communication speed becomes lower, but the error resilience becomes higher. To the contrary, as the MCS index is higher, the error resilience becomes lower, but the communication speed becomes higher. Thus, for example, when the wireless router 102 is notified from the HMD 101-N to decrease the error occurrence frequency, it performs control to decrease the MCS index.

When the wireless router 102 receives a transmission priority change instruction from the HMD 101-N to decrease the communication delay occurrence frequency, it performs control to increase the transmission priority of an MR image packet to be transmitted to the HMD 101-N. The transmission priority is changed by, for example, changing the access category or TXOP (Transmission Opportunity) limit of an MR image packet to be transmitted to the HMD 101-N. In this embodiment, the wireless router 102 changes the transmission priority by changing the access category. However, another arbitrary method is also usable as long as the transmission standby time of an MR image packet can be changed.

By the above-described operation of the wireless router 102, the error/communication delay occurrence frequency of an MR image packet to be received by the HMD 101-N can be controlled. Even when the 802.11a/b/g/n autonomous distributed wireless communication scheme similar to 802.11ac is used, the error/communication delay occurrence frequency can be controlled by the above-described operation.

The relationship between the communication quality and communication control in this embodiment will be explained with reference to FIG. 7. In FIG. 7, the error occurrence frequency and the communication delay occurrence frequency are plotted altogether along one axis. However, these frequencies are different indices in practice, so thresholds are set individually for the error occurrence frequency and the communication delay occurrence frequency, respectively, and the respective frequencies are individually compared with their thresholds.

In FIG. 7, the error/communication delay occurrence frequency is lower than the third threshold in a period 701. Thus, the HMD 101-N generates a communication control packet representing that the current communication control should be maintained, and transmits the packet to the wireless router 102. The wireless router 102 operates based on the received communication control packet, and does not change the transmission priority and at least either of the modulation scheme and error correction code of an MR image packet to be transmitted to the HMD 101-N in the period 701.

In a period 702, the error/communication delay occurrence frequency exceeds the third threshold. Thus, the HMD 101-N generates a communication control packet notifying a change of communication control, and transmits the packet to the wireless router 102. For example, when the error occurrence frequency exceeds its third threshold, the HMD 101-N generates a communication control packet notifying a change of at least either of the modulation scheme and the error correction code. For example, when the communication delay occurrence frequency exceeds its third threshold, the HMD 101-N generates a communication control packet notifying a change of the transmission priority. The wireless router 102 performs communication control in accordance with the communication control packet received from the HMD 101-N. That is, the wireless router 102 changes one or both of the priority and at least either of the modulation scheme and error correction code of an MR image packet to be transmitted to the HMD 101-N. That is, the wireless router 102 performs communication control to prevent the error/communication delay occurrence frequency from exceeding the first threshold. If communication control is performed but the error/communication delay occurrence frequency exceeds the first threshold, switching of the HMD display image is performed, as in the first embodiment.

In a period 703, the error/communication delay occurrence frequency becomes lower than the third threshold. Thus, the HMD 101-N generates a communication control packet representing a return to the same communication control as that in the period 701, and transmits the packet to the wireless router 102. Based on the received communication control packet, the wireless router 102 transmits the MR image packet to the HMD 101-N by using the same modulation scheme and error correction code as those in the period 701 and the transmission priority.

By the above-described operations of the HMD 101-N and wireless router 102, when the error/communication delay occurrence frequency exceeds the third threshold, communication control can be changed before the error/communication delay occurrence frequency exceeds the first threshold. Accordingly, the error/communication delay occurrence frequency can be reduced, and the probability at which the HMD display image is switched to a captured image can be decreased.

Note that this embodiment has been explained on the assumption that the HMD 101-N and the wireless router 102 use the 802.11ac autonomous distributed wireless communication scheme. However, a wireless communication scheme using a TDMA (Time Division Multiple Access) scheme, such as 802.11ad, may also be used. In this case, the error occurrence frequency can be controlled by changing the MCS. By changing the time assignment of packet transmission, the communication delay occurrence frequency can also be controlled.

In this embodiment, when the error/communication delay occurrence frequency exceeds the third threshold, communication control of an MR image packet transmitted from the wireless router 102 is performed. However, in a communication situation in which the error/communication delay occurrence frequency exceeds the third threshold, an error/communication delay may occur in even a captured image packet transmitted from the HMD 101-N. To solve this, the above-described communication control may be performed on even a captured image packet transmitted by the HMD 101-N.

In this embodiment, the state of the communication quality is determined based on the results of comparisons between the error occurrence frequency and communication delay occurrence frequency and their third thresholds, and communication control is performed. However, only either of the error occurrence frequency and communication delay occurrence frequency may be used. The determination indices of the state of the communication quality are not limited to them, and the strength of a received signal, the EVM of a received signal, and the like may also be used.

The present invention can implement switching of the image display suited to viewing in accordance with the state of the communication quality.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-149162, filed Jul. 22, 2014, which is hereby incorporated by reference herein in its entirety.

What is claimed is:

1. A display comprising:
a memory storing instructions; and
at least one processor that, upon execution of the stored instructions, functions as
an obtaining unit configured to obtain a first image by image capturing;
a reception unit configured to receive, from an external apparatus, a second image generated based on the first image;
a determination unit configured to determine a communication quality with the external apparatus in reception by said reception unit; and
a display control unit configured to control to display the second image on a display unit until a value indicating a degree of degradation of the communication quality exceeds a first threshold as a result of determination by said determination unit, and display the first image on the display unit when the value indicating the degree of degradation of the communication quality exceeds the first threshold,
wherein said display control unit controls to display the first image until the value indicating the degree of degradation of the communication quality becomes smaller than a second threshold smaller than the first threshold after exceeding the first threshold.

2. The display according to claim 1, wherein the value indicating the degree of degradation of the communication quality includes a first frequency at which an error occurred in communication when receiving the second image.

3. The display according to claim 2, wherein the at least one processor further functions as a change unit configured to, when the first frequency exceeds a third threshold smaller than the first threshold, change at least one of a modulation scheme and an error correction code used when receiving the second image, so as to decrease the first frequency.

4. The display according to claim 3, further comprising a transmitter that transmits one of the first image and other information to the external apparatus,
wherein when the first frequency exceeds the third threshold, said change unit changes at least either of the modulation scheme and the error correction code when transmitting one of the first image and the other information.

5. The display according to claim 1, wherein the value indicating the degree of degradation of the communication quality includes a second frequency at which reception of the second image is not completed till a timing corresponding to a timing to display an image by said display control unit.

6. The display according to claim 5, wherein the at least one processor further functions as a change unit configured to, when the second frequency exceeds a third threshold smaller than the first threshold, change priority when transmitting the second image, so as to decrease the second frequency.

7. The display according to claim 6, further comprising a transmitter that transmits one of the first image and other information to the external apparatus,
wherein when the second frequency exceeds the third threshold, said change unit further changes the priority when transmitting one of the first image and the other information.

8. The display according to claim 1, wherein when the communication quality is determined to be in a poor state, said display control unit further controls to display information representing that the communication quality is in the poor state.

9. The display according to claim 8, wherein when the communication quality is determined to be in a poor state, said display control unit further controls to display information representing a cause of the poor state of the communication quality.

10. The display according to claim 1, wherein the display is a head-mounted display.

11. A method for controlling a display including a memory and at least one processor that functions as an obtaining unit configured to obtain a first image by image capturing, and a reception unit configured to receive, from an external apparatus, a second image generated based on the first image, the method comprising:
determining a communication quality with the external apparatus in reception by the reception unit; and
controlling to display the second image on a display unit until a value indicating a degree of degradation of the communication quality exceeds a first threshold as a result of determination in the determining, and display the first image on the display unit when the value indicating the degree of degradation of the communication quality exceeds the first threshold,
wherein in the controlling, the first image is displayed until the value indicating the degree of degradation of the communication quality becomes smaller than a second threshold smaller than the first threshold after exceeding the first threshold.

12. A non-transitory computer-readable storage medium storing a computer program for causing a computer of a display including an obtaining unit configured to obtain a first image by image capturing, and a reception unit configured to receive, from an external apparatus, a second image generated based on the first image, to execute a control method, wherein the control method comprising:
determining a communication quality with the external apparatus in reception by the reception unit; and
controlling to display the second image on a display unit until a value indicating a degree of degradation of the communication quality exceeds a first threshold as a result of determination in the determining, and display the first image on the display unit when the value indicating the degree of degradation of the communication quality exceeds the first threshold,
wherein in the controlling, the first image is displayed until the value indicating the degree of degradation of the communication quality becomes smaller than a second threshold smaller than the first threshold after exceeding the first threshold.

* * * * *